United States Patent Office 3,401,794
Patented Sept. 17, 1968

3,401,794
BENEFICIATION OF TIN-BEARING ORES
Joseph R. Farnand, Frederick W. Meadus, and Ira E. Puddington, Ottawa, Ontario, Canada, assignors to Canadian Patents and Development Limited, Ottawa, Ontario, Canada, a corporation of Canada
Filed July 12, 1965, Ser. No. 471,073
3 Claims. (Cl. 209—5)

ABSTRACT OF THE DISCLOSURE

There is added to an aqueous suspension of crushed tin bearing ore a conditioning agent consisting of at least one of water soluble salts of fatty alcohol sulfates, petroleum sulfonates, naphthenic acids, fatty acids and their hydroxylated, halogenated and branched chain derivatives and esters thereof, arsonic acids and their aryl derivatives, oxidized and sulfonated hydrocarbon oils, fish oils, inedible tallow, tall oils, resin acids, dichloroacetic acid, chlorobenzoic acid, non-ionic compounds of fatty acids, thiourea, and aliphatic mercaptans, and a bridging liquid consisting of a petroleum base oil. The suspension is then subjected to an agitation step to condition the tin particles. Prior to or during the agitation step, the suspension is subjected to a milling step in order to grind the crushed ore to mineral release size. The suspension is further agitated to produce a bridging liquid phase loaded with the mineral and this phase is removed from the suspension for recovery of tin therefrom.

---

This invention relates to the extraction of tin from tin-containing ores and concentrates thereof.

Tin ores usually contain small percentages (about 0.3 to 3%) of tin as cassiterite ($SnO_2$), together with other sulfide and gangue minerals, such as sphalerite, pyrite, arsenopyrite, and siliceous gangue materials.

Conventional processes for the extraction of cassiterite from the ores are relatively expensive. Concentration of the ore is frequently effected by wet gravity methods. Another procedure is to roast the crushed or mass using carbon as a reducing agent and chlorine as a chlorinating agent. The tin is recovered as volatile chlorides.

With some grades of ores, very fine grinding is required in order to release the cassiterite therefrom. The resultant slimes are not susceptible to high recovery by prior art procedures.

An object of the present invention is to provide a more economical process for the extraction of tin from tin-bearing ores or concentrates wherein the tin is extracted as cassiterite directly from a crushed ore body in a rapid and effective manner, and wherein recovery of tin is substantially improved from all grades of ores.

Figure 1:
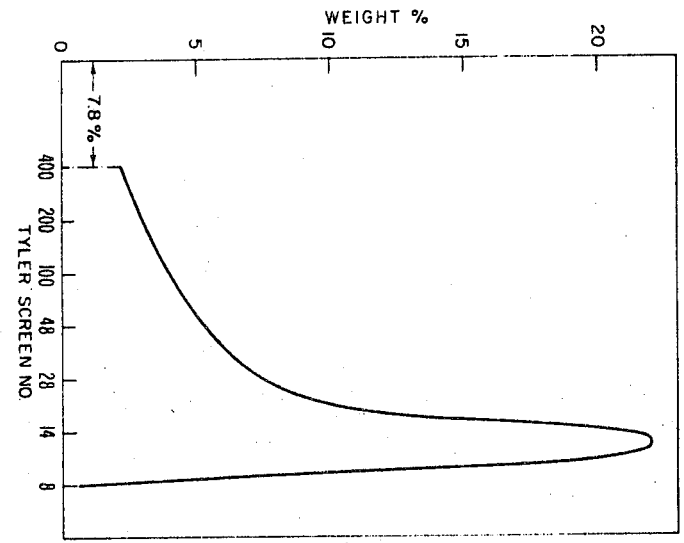
Figure 2:
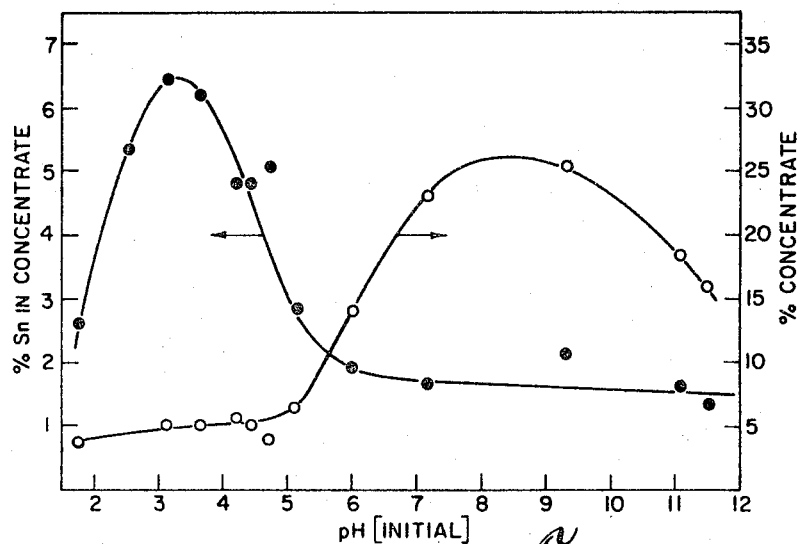
Figure 3:
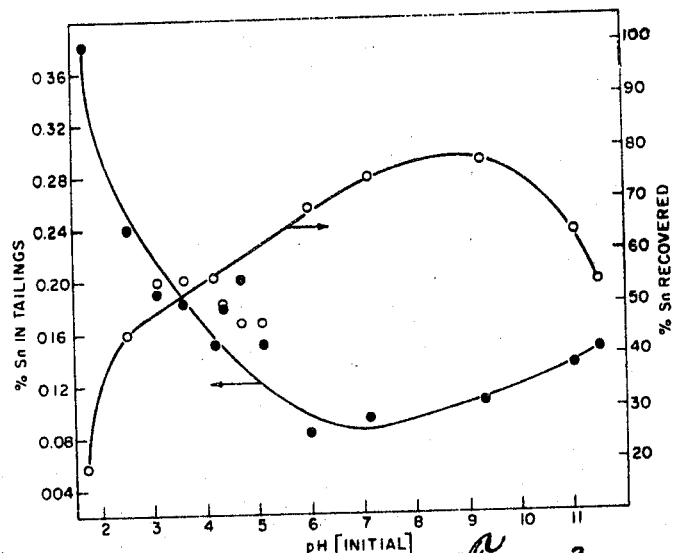
Figure 4:
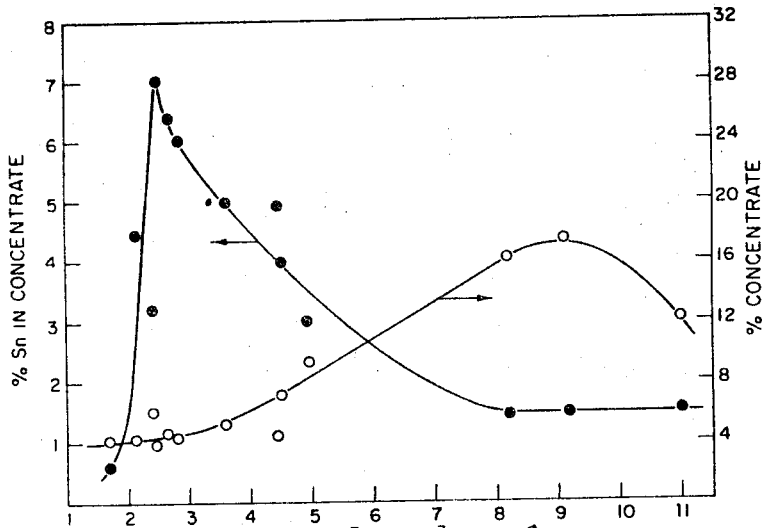
Figure 5:
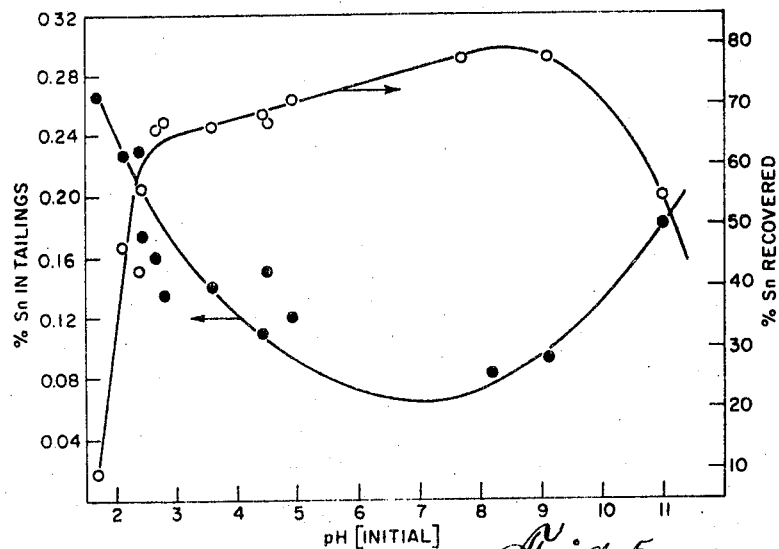
Figure 6:
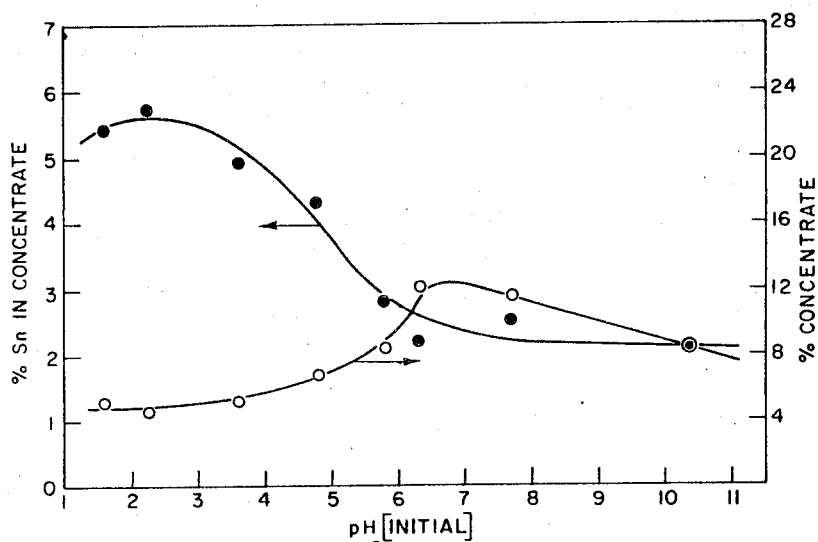
Figure 7:
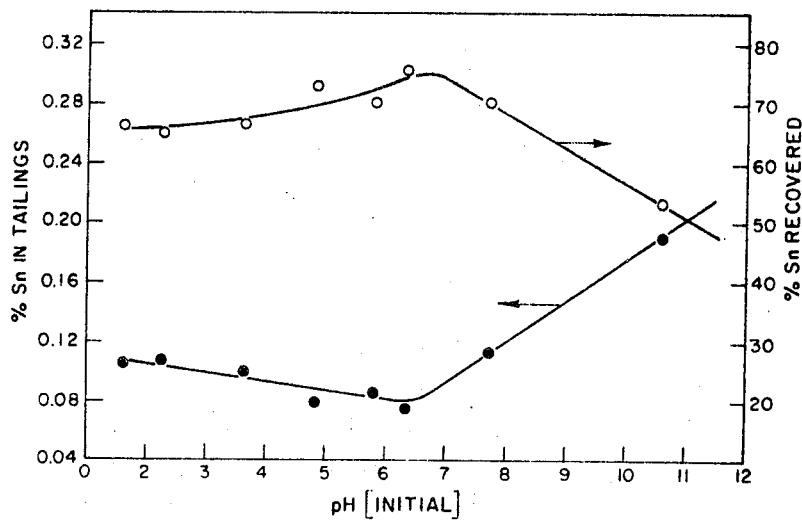
Figure 8:
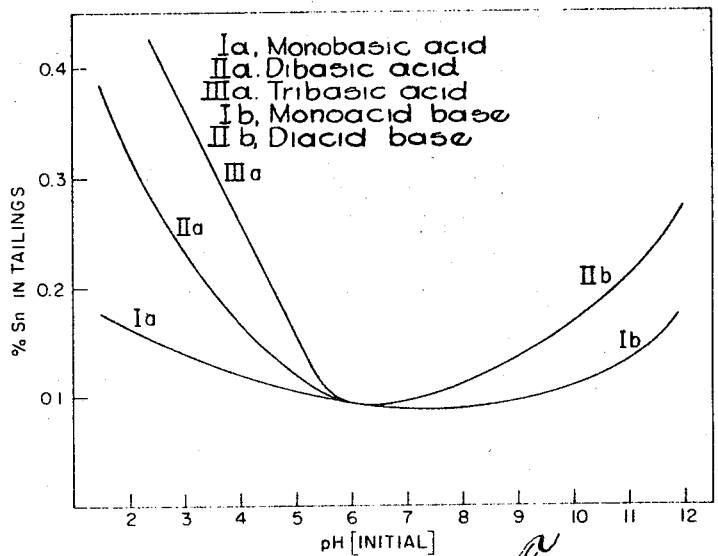
Figure 9:
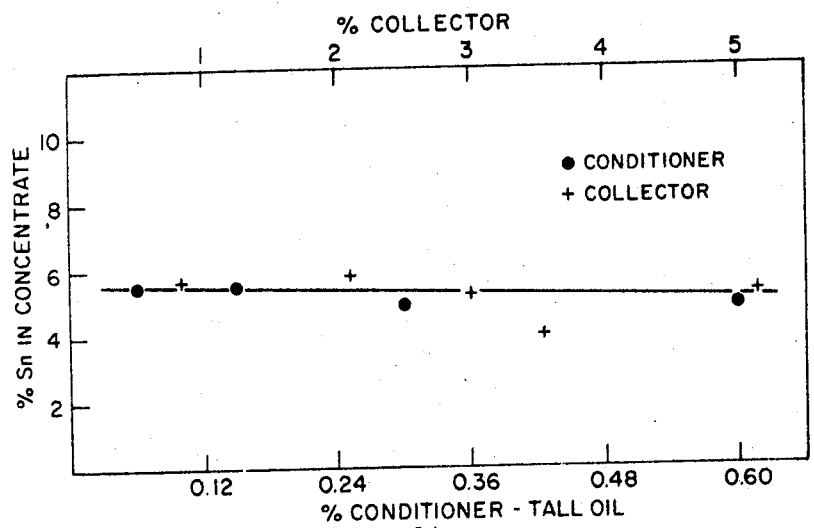
Figure 10:
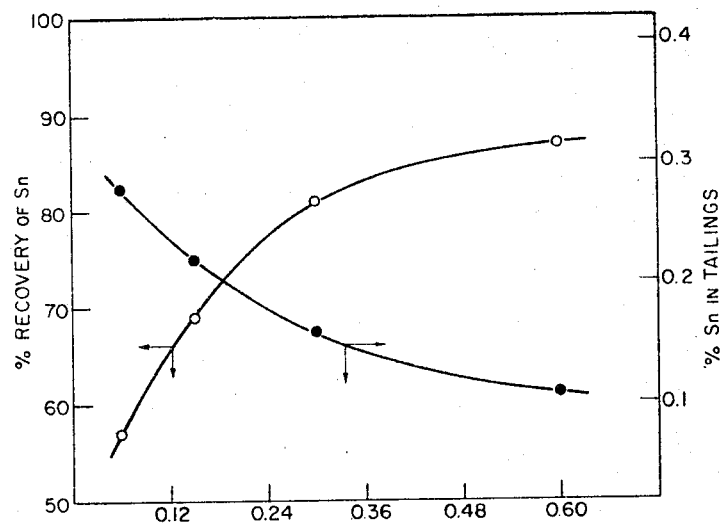

The invention will be described with reference to the accompanying drawings, in which FIGURE 1 is a graph depicting the distribution of particle sizes in a typical −8 mesh ore feed, FIGURE 2 illustrates the effect of pH on tin extraction and concentrate amount, using tall oil, FIGURE 3 is a graph illustrating the effect of pH on tin extraction in respect of tailings and tin recovery, using tall oil, FIGURE 4 is a graph showing the effect of pH on tin extraction in respect of concentrate amount and amount of tin in concentrate, using naphthenic acid, FIGURE 5 is a graph showing the effect of pH on tin extraction in respect of tailings and tin recovery, using naphthenic acid, FIGURE 6 is a graph showing the effect of pH on tin extraction in respect of concentrate amount and amount of tin in concentrate, using phenylarsonic acid, FIGURE 7 is a graph showing the effect of pH on tin extraction in respect of tailings and tin recovery, using phenylarsonic acid, FIGURE 8 is a graph showing the effect of different acid and alkali types on tin recovery, FIGURE 9 is a graph showing the effect of conditioner and collector concentrations on the grade of the recovered concentrate, and FIGURE 10 is a graph showing the effect of conditioner and collector concentrations on the recovery of tin and its concentration in the tailings.

The present invention utilizes the principle of spherical agglomeration in the separation of desired constituents from a body of mixed solids, this principle and examples thereof having been described in various publications, as well as in copending application for patent Ser. No. 218,571, filed Aug. 22, 1962, (now Patent No. 3,268,071.)

The general application of this principle comprises suspending the solid mixture to be separated in one liquid and agitating the suspension with a second liquid that is at most only sparingly soluble in the suspending medium and preferentially wets the surface of the solid particles to be collected. Collisions between the preferentially wetted particles result in adhesion, owing to the interfacial surface tension of the two liquids. Further agitation causes the loose aggregates initially formed to produce much more efficiently packed masses that can be separated mechanically. The surface properties of the solids to be recovered can be manipulated by reactive conditioning agents to make them wetted by the second liquid phase (or bridging liquid) in much the same manner as particles are rendered air avid in flotation separations.

The ore under treatment is ground to a size sufficient to release the mineral therein. In one aspect of the invention, the treatment in accordance therewith may be effected simultaneously with comminution of the ore to mineral release size. In another aspect, the comminution step may be performed in the presence of a conditioner but in the absence of a bridging liquid. In still another aspect, comminution to release size may be performed as a separate step preliminary to treatment in accordance with the invention. When the comminution step is combined with a treatment step, very effective results are obtained with a starting mesh size of the order of −6 to −8. FIGURE 1 shows a typical sieve analysis of a −8 mesh feed ore, which has been found to be very satisfactory when the comminution step is effected simultaneously with the treatment in accordance with the invention.

Conditioners which are operative in accordance with the invention comprise water soluble salts of fatty alcohol sulfates; petroleum sulfonates; naphthenic acids; fatty acids and their derivatives such as hydroxylated, halogenated or branched chain ($C_8$ or above) fatty acids or esters thereof; arsonic acids and their derivatives such as aryl arsonic acids; oxidized and sulfonated hydrocarbon oils; fish oils; inedible tallow; tall oils; resin acids; dichloroacetic acid; chlorobenzoic acid; non-ionic compounds of fatty acids e.g. sorbitan stearate, polyoxyethylene oleate and the like; thiourea; and $C_5$ or higher aliphatic mercaptans.

The bridging liquid employed is selected from the group consisting of petroleum and derivatives thereof. Various crude oils are suitable and may be used either as they occur or in partially oxidized form to raise the viscosity and to increase the oxygen content for surface activity. Fuel oils, such as Bunker C grade, may be used.

Treatment in accordance with the invention is carried out with the tin ore mass in aqueous suspension. The ore content of the suspension during the agglomeration step is not more than 50% and preferably 15 to 35% by weight. However, the comminution step may be conducted efficiently with 60 to 70% solids.

The conditioning agent is added to the suspension in an amount of about 0.05 to 1.00% based on the dry weight of the ore and its mineral content to render the mineral particles hydrophobic.

The bridging liquid or collector is added to the suspension in an amount of about 1 to 10%, based on the dry weight of the ore.

Following addition of the bridging liquid, agglomeration is effected with agitation of the suspension.

It is of importance that, during the agglomeration step, the pH of the suspension be determined and, if necessary, controlled in accordance with the desired concentration and recovery of tin. The pH of the suspension has a pronounced effect on both grades and recovery. Thus, the pH should be adjusted to 2–4.5 for high grades in the concentrates or 6–11 if high recovery is desired.

As previously indicated, in that aspect of the invention wherein comminution of the ore body (of, say −6 to −8 mesh feed) in water is effected simultaneously with the agglomeration step, the suspension contains a conditioner and a bridging liquid during the grinding operation. This milling or grinding operation may be carried out in a ball mill or the like and effects grinding to the release size of the cassiterite or tin mineral. This size will depend upon the particular ore and may vary from 60 to 400 mesh. During the grinding the ore particles become conditioned and migrate to the oil phase to produce coherent semi-solid bodies while the gangue stays preferentially in the aqueous phase. The concentrate can be separated from the gangue easily by a mechanical operation. In one example, using an ore containing about 0.3% of tin, grades from 1.5 to 7.0% were obtained with recoveries in the 80–50% range by varying the pH of the system.

FIGURES 2 to 7 show the results of experiments which illustrate the effect of pH on grades and recovery, and which were conducted under the following conditions, Mesh size of feed ore _ −8.
Ore to water ratio _____ 1:2.
Milling time _____ 2 hours.
Bridging liquid _____ 3% crude petroleum oil based on dry ore weight.
Conditioner _____ 0.2% based on dry ore weight.

It may be mentioned that only minor changes in recovery were observed when grinding times varied from 1 to 3 hours using a six inch diameter porcelain mill with flint pebbles.

The concentrates were recovered by emptying the contents of the mill on a 20-mesh sieve, washing with a water spray, and hand-separating the grinding media and agglomerates.

FIGURES 2 and 3 show the effect of pH on tin extraction with tall oil activation. FIGURE 2 indicates grade and concentrate amount and FIGURE 3 tailings and tin recovery. It will be observed that the desirable pH range is 2.5–4.5 for high grades. A wet analysis of several blended ashed, concentrates collected in this pH range indicated the following composition:

| | Percent |
|---|---|
| $Fe_2O_3$ | 31.2 |
| $SiO_2$ | 18.4 |
| $ZnO$ | 16.5 |
| $Al_2O_3$ | 13.9 |
| $SnO_2$ | 6.5 |
| $As_2O_3$ | 3.7 |
| $TiO_2$ and $ZnO_2$ | 1.6 |
| $CuO$ | 1.4 |
| $PbO$ | 0.5 |
| $Sb$ | 0.1 |
| $Ca$ | 0.2 |
| Not determined | 6.0 |

The percentage of tin obtained in the wet analysis agreed well with the spectroscopic value.

FIGURES 4 and 5 show the effect of pH with naphthenic acid activation. The pH value for maximum grade is 2.2 to 3.5.

FIGURES 6 and 7 show the effect of pH with phenylarsonic acid activation, and shows the pH value for maximum grade as about 2 to 4. With this specific conditioner maximum recoveries occur within the pH range 6 to 8.

In this series of experiments the pH values were altered by the addition of sulphuric acid or sodium hydroxide to the system. With no adjustment the pH would vary from about 5 with naphthenic acid to about 6 with tall oil and arsonic acids. With some ores this "natural" pH represents a desirable compromise of grade and recovery for a one-step process.

It is thus a feature of the invention that the initial pH of the system be adjusted to within the range 2 to 4.5 for high grades or 6 to 11 for high recoveries.

The effect of using different acids and bases to adjust the pH is shown in FIGURE 8. While tall oil was the conditioner used in these experiments, it will be apparent that corresponding results would be obtained with other conditioners. The following acids were tested:

Monobasic _____ Hydrochloric, nitric, acetic, formic.
Dibasic _____ Sulphuric, carbonic, tartaric, oxalic.
Tribasic _____ Phosphoric, citric.

The curves are average values for the several acids. It is evident that at constant hydrogen ion concentration the recoveries at the lower pH values are affected by the type of acid used. With monobasic acids the recovery was nearly constant in the pH range of about 2.5 to 5.5 as indicated by the amount of tin remaining in the tailings. In contrast, the dibasic and tribasic acid showed an increasing and larger fall-off in recovery as the system became more acidic. The experiments indicate that there is an advantage in using monobasic acids instead of sulphuric to obtain high grades in the concentrate.

FIGURES 9 and 10 show the results of a series of experiments in which the amounts of conditioning agent and bridging liquids or collector were separately varied while other conditions (as previously set forth) were maintained constant. The conditioner was tail oil and the collector crude petroleum oil. The pH was 3.5–4.5. It will be observed that the tin grade of the concentrate was virtually unaffected over a wide range of concentration of both tall oil and crude oil. The amount of tin recovered and hence the tailing concentration were substantially improved at the higher concentrations of both these reagents (0.36–0.60% conditioner and 3–5% collector).

As previously indicated, the agglomeration step may be conducted as a separate operation following comminution. In this form of the invention, the comminution step is usually conducted with addition of the conditioner but in the absence of bridging liquid. The preconditioned ground ore pulp, diluted with water to a density of about 15–35% by weight, and the petroleum oil or other bridging liquid are added to a vessel having agitating means therein. After agitation for a short period, say, 15 to 30 minutes, the tin mineral migrates to the oil phase.

An important aspect of the invention resides in the unexpected fact that the selectivity of a partially loaded oil for tin is considerably greater than fresh oil. Thus, it is desirable to utilize the remaining partially loaded oil in the agitating vessel, after removal of part of the oil-tin mineral concentrate, by adding another portion of pre-conditioned ore pulp thereto and the agitating step repeated until the oil becomes saturated with ore particles. In two separate experiments, typical assays indicated grades of 1.1, 1.9, 2.2, 2.5% and 0.63, 2.3, 3.0% of tin, following successive additions of the feed ore to the agitating vessel. In the second series the grades of the tailings were 0.05, 0.06, and 0.08%.

The advantageous effect of using a partially mineral-loaded bridging liquid may be gained by re-cycling of such a liquid or by employing an initial excess of oil and feeding the ore in increments to the treating vessel.

The recovery-grade pattern in the separate agglomeration step is similar to that in the one-step process but the recovery is generally higher in the former. In the pH range of 6—9 the tailings usually contain about 0.02–0.04 tin with a head sample of 0.3–0.6%. The grade of the concentrate is 1.5–2.0% tin. The original ore splits into concentrate and tailings fractions in a ratio of about 1:3 in this pH range giving an overall recovery in the concentrate of about 95%.

In the upgrading step on tall oil (or carboxylic acid type) conditioned oil-bonded aglomerate, it is desirable to adjust the pH of the aqueous phase to about 2–4 with, for instance, a monobasic acid. This causes a large tailing fraction to migrate into the aqueous phase. This aqueous phase fraction may be about 50% of the ore in the concentrate and the grade in tin may be in the range 0.2–0.5%. In a continuous operation, this fraction would normally be returned to the ore feed.

The concentrate in the oil is recovered by extracting or burning off the oil. However, it may also be agitated again with a water solution of a conditioning agent such as phosphoric acid or sodium sulphide that will cause a tin rich fraction to move into the aqueous phase. This separated fraction may then be treated by known methods to recover metallic tin while a major part of the oil that still contains tin is re-cycled to the agglomerator feed.

The agitating vessel for the separate agglomeration stage may comprise a standard grease kettle equipped with two slow concentric stirrers rotating in opposite directions. Another suitable device for the purpose may comprise a squirrel cage type agitator rotating at about 100 r.p.m. and moving freely in a cylindrical or other elongated container. A second agitator inside the squirrel cage comprises a series of multiblade propellers mounted on a central shaft.

It is obvious that the agglomeration step or concentration consisting of the loading of the oil phase with the tin mineral may be conducted either as a batch or continuous procedure.

The following is an example of the two stage procedure:

An aqueous ore pulp of 60% density by weight was ground with 0.2% of tall oil in a 6-inch diameter porcelain jar mill to about 95%–150 mesh. Typically 75 steel balls ¾ inch in diameter were used and the grinding time was 45 minues to 1 hour. About 100 grams of Bunker C oil were added to a 1 litre grease kettle containing the conditioned ore pulp diluted with water to a density of 15–35%. After about 15 minutes of stirring, the mineral had migrated to the oil phase.

Assays have indicated that the effect of pH on the grades noted in the one-stage procedure was well reproduced in the two-stage operation. The tailing grades, however, were much lower, commonly in the order of 0.02–0.05% in the pH range of 6–9 compared to a minimum of 0.08% in the ball mill operation. Recoveries of tin in this pH range were thus in the order of 95% when the head assay was 0.3–0.5%. The grade of the tailings increased to about 0.15% as the pH of the system was lowered to 3 with hydrochloric acid. The recoveries under acid conditions were consequently lower.

The following chart summarizes a series of experiments, using ore from Mount Pleasant, New Brunswick, Canada, which has been subject to a primary concentration step:

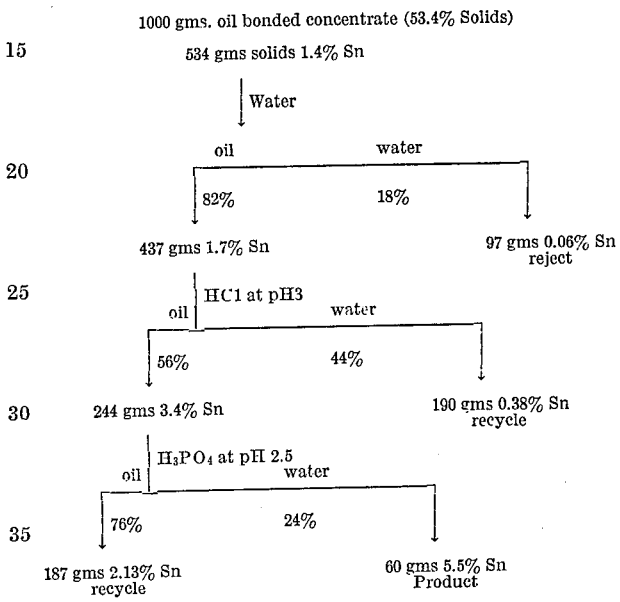

These experiments were carried out in porcelain jar mills loaded with flint pebbles. Milling was commonly carried out for one hour. In a typical experiment in the first step 1000 grams of primary concentrate containing 53.4 percent of solids 27.6% oil and 19% water were milled with a further quantity of water. Eighteen percent or 97 grams of essentially barren material migrated to the aqueous phase. This was followed by a similar treatment with aqueous hydrochloric acid at pH 3. Forty-four percent of the remaining solids or 190 grams migrated to the aqueous phase with this treatment and the grade of the concentrate was raised to 3.4% of tin. The grade of the reject was about the equivalent of the original ore and under a continuous system would be recycled. A final treatment of the concentrate with aqueous phosphoric acid at pH 2.5 reduced the solids in the oil to about 20%. The tin content of these solids was about 1.7%. The grade of the oil reject with the phosphoric acid treatment was 5.5% tin. Sixty grams or 24% of the solids content of the concentrate came into the aqueous phase with the phosphoric acid treatment. This represented 44% of the tin in the primary concentrate or 42% of the tin in the original ore. The aqueous phase product was very clean containing no oil. Spectrographic analysis indicated only tin and silica as major constituents. A major mineral constituent of the ore body, sphalerite, and the other sulphides remained in the oil phase. At this stage the zinc content of the oil phase was 10%.

In order to appraise expected results in continuous operation, this partially stripped oil phase was contacted in the above described grease kettle with eight successive portions of fresh, conditioned ore pulp each containing about 120 grams of ore. With the exception of the first portion, the tailings assayed below 0.08% of tin. The tailings from the first contact contained 0.3% probably owing to residual phosphoric acid from the previous treatments. The concentration of tin in the oil phase remained virtually constant throughout this simulated recycle experiment. The loading of the oil phase increased to 56% solids or to about its original value. The new oil concentrate was again run through the successive treatments with water, hydrochloric and phosphoric acids. The behaviour was very similar to the previous series. Water expelled about 13% of the solids containing 0.056% tin. The reject from the hydrochloric acid treatment, this time at a lower pH, had a considerably higher tin grade nearly 1.5%. The phosphoric acid reject gave a grade of 8.2% tin. This was again a clean product and appeared to be composed mostly of cassiterite and quartz.

The solids in the oil phase were again reduced to less than 30% by this second treatment and it has been found that this oil could be cycled at least a third time before it would be necessary to treat it for zinc recovery. The zinc content at the end of the second cycle was 16%, or at the end of the third cycle, 23%.

The possibility of recovering tin from the tailings of the hydrochloric acid treatment was next examined. The tailings containing 0.38% tin were contacted with fresh tall oil and petroleum with no adjustment of the pH. The grade of the tailings from this treatment was 0.15% tin. This probably represents minimum recovery since blending the relatively small volume of thickened tailings with the main ore feed would have little influence on the pH of the larger system. While undoubtedly some losses of hydrochloric and phosphoric acids would be expected a fairly high percentage should be reuseable.

These experiments indicate that the overall recovery of tin having a head grade of 0.3–0.5% of tin would be about 90% with a grade of at least 5% of tin.

Experiments were carried out using a low grade ore originating in British Columbia, Canada, initially assaying at 0.11% tin. Preliminary agglomeration resulted in an oil concentrate containing 47% of solids with a grade of 0.34% tin. This represents a recovery of 82%. The tailings assayed at 0.02–0.03% of tin. The second step treatment raised the grade to 0.90%, as will be apparent from the following chart summarizing the experiments:

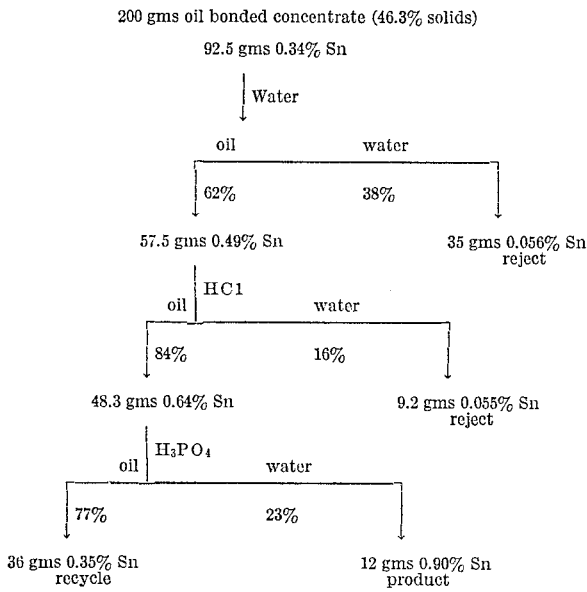

Another sample of low grade ore originating in Cornwall, England, was subjected to a series of experiments. This sample originally contained 0.4% of tin and was upgraded by agglomeration to a grade of 1.6% with a 90% recovery of the tin. In this case the tailing grade was 0.12%. The secondary treatment raised the grade in the oil free concentrate to 4.0%, as will be evident from the following chart:

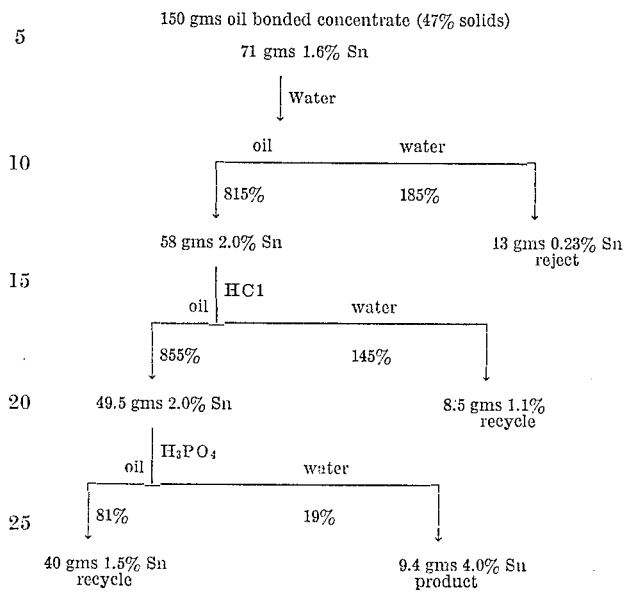

The last three series of experiments indicate that it is desirable to employ a monobasic acid (such as HCl) to adjust the pH in the first stage wherein the tin is recovered in the oil phase, and to use a tribasic acid (such as H₃PO₄) in the second stage to cause the tin rich fraction to move to the aqueous phase.

We claim:

1. A process for beneficiating tin-bearing ores which comprises the successive steps of crushing said ore, forming an aqueous suspension of said crushed ore, adding to said supension 0.05 to 1.00%, based on the dry weight of said ore, of a conditioning agent selected from the group consisting of water soluble salts of fatty alcohol sulfates, petroleum sulfonates, naphthenic acids, fatty acids and their hydroxylated, halogenated and branched chain derivatives and esters thereof, arsonic acids and their aryl derivatives, oxidized and sulfonated hydrocarbon oils, fish oils, inedible tallow, tall oils, resin acids, dichloroacetic acid, chlorobenzoic acid, non-ionic compounds of fatty acids, thiourea, and aliphatic mercaptans, subjecting said ore suspension to a comminution step by milling to reduce the ore particles to mineral release size of the order of −6 mesh including slimes, and to condition said particles with said conditioning agent, adding 1 to 10%, based on the dry weight of said ore, of petroleum oil to said milled and conditioned suspension, adjusting the pH of said suspension to selectively determine grade and recovery values of the extracted tin, subjecting said suspension containing said oil to a separate agglomeration step by agitating said suspension to produce an oil phase therein containing a tin-rich fraction, removing said oil phase from said suspension, adding to said removed oil phase water and an agent selected from the group consisting of phosphoric acid and sodium sulphide to produce a second suspension, and agitating said second suspension to cause said tin-rich fraction to move into the aqueous phase of said second suspension.

2. A process for beneficiating tin-bearing ores as defined in claim 1, including the further steps of removing the solids in said aqueous phase containing said tin-rich fraction from said second suspension, and recycling the tin-depleted oil phase from said second suspension to said first suspension.

3. A process for beneficiating tin-bearing ores which comprises the successive steps of crushing said ore, forming an aqueous suspension of said crushed ore, adding to said suspension 0.05 to 1.00%, based on the dry weight of said ore, of a conditioning agent selected from the group consisting of water soluble salts of fatty alcohol acids and their hydroxylated, halogenated and branched chain derivatives and esters thereof, arsonic acids and their aryl derivatives, oxidized and sulfonated hydrocarbon oils, fish oils, inedible tallow, tall oils, resin acids, dichloroacetic acid, chlorobenzoic acid, non-ionic compounds of fatty acids, thiourea, and aliphatic mercaptans, subjecting said ore suspension to a comminution step by milling to reduce the ore particles to mineral release size of the order to −6 mesh including slimes, and to condition said particles with said conditioning agent, adding 1 to 10%, based on the dry weight of said ore, of petroleum oil to said milled and conditioned suspension, adjusting the pH of said suspension to selectively determine grade and recovery values of the extracted tin, subjecting said suspension containing said oil to a separate agglomeration step by agitating said suspension to produce an oil phase therein containing a tin-rich fraction, separating said oil phase, adding water thereto and adjusting the pH of the resulting mixture to 2 to 4.5 with a monobasic acid, agitating said mixture to produce an enriched tin fraction in said oil phase through loss of gangue material to the aqueous phase, separating said last-mentioned enriched oil phase, adding water thereto to form a second mixture and adjusting the pH thereof to about 2.5 to 4.5 with a tribasic acid, agitating said second mixture containing said tin-rich oil phase to produce an aqueous phase therein containing a solids fraction still further enriched in tin, and removing the solids fraction in said tin-rich aqueous phase for recovering of tin therefrom.

References Cited

UNITED STATES PATENTS

| | | | |
|---|---|---|---|
| 1,585,755 | 5/1926 | Borcherdt | 209—5 X |
| 3,259,237 | 7/1966 | Schoeld | 209—166 X |
| 3,568,071 | 8/1966 | Puddington et al. | 209—5 |
| 3,298,617 | 1/1967 | Engel | 209—5 X |

FOREIGN PATENTS

| | | |
|---|---|---|
| 238,845 | 11/1959 | Australia. |
| 554,129 | 6/1943 | Great Britain. |
| 584,206 | 1/1947 | Great Britain. |

HARRY B. THORNTON, *Primary Examiner.*

R. HALPER, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,794                           September 17, 1968

Joseph R. Farnand et al.

It is certified that error appears in the above identified patent and that said Letters Patent are hereby corrected as shown below:

Column 9, line 2, after "alcohol" insert -- sulfates, petroleum sulfonates, naphthenic acids, fatty --; line 9, "comminuation" should read -- comminution --.

Signed and sealed this 17th day of February 1970.

(SEAL)
Attest:

Edward M. Fletcher, Jr.                         WILLIAM E. SCHUYLER, JR.
Attesting Officer                                  Commissioner of Patents